US012596767B2

(12) United States Patent
Ba et al.

(10) Patent No.: US 12,596,767 B2
(45) Date of Patent: Apr. 7, 2026

(54) ACTIVE LEARNING DRIFT ANALYSIS AND TRAINING

(71) Applicant: International Business Machines Corporation, Armonk, NY (US)

(72) Inventors: Amadou Ba, Navan (IE); Venkata Sitaramagiridharganesh Ganapavarapu, Elmsford, NY (US); Seshu Tirupathi, Dublin (IE); Bradley Eck, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1045 days.

(21) Appl. No.: 17/541,823

(22) Filed: Dec. 3, 2021

(65) Prior Publication Data

US 2023/0177118 A1      Jun. 8, 2023

(51) Int. Cl.
G06F 18/21        (2023.01)
G06F 18/214       (2023.01)
G06N 3/045        (2023.01)
(52) U.S. Cl.
CPC ...... *G06F 18/2193* (2023.01); *G06F 18/2148* (2023.01); *G06N 3/045* (2023.01)
(58) Field of Classification Search
CPC .. G06F 18/2193; G06F 18/2148; G06N 3/045
See application file for complete search history.

(56) References Cited

U.S. PATENT DOCUMENTS 7,512,582 B2    3/2009   Cao et al.
7,792,353 B2    9/2010   Forman et al.
(Continued)

FOREIGN PATENT DOCUMENTS

CN    109151995 A    1/2019
CN    111126255 A    5/2020
JP    2018-537798 A    12/2018

OTHER PUBLICATIONS

Nishida, Kyosuke, Koichiro Yamauchi, and Takashi Omori. "ACE: Adaptive classifiers-ensemble system for concept-drifting environments." Multiple Classifier Systems: 6th International Workshop, MCS 2005, Seaside, CA, USA, Jun. 13-15, 2005. Proceedings 6. Springer Berlin Heidelberg, 2005. (Year: 2005).*
(Continued)

*Primary Examiner* — Andrew T Chiusano
(74) *Attorney, Agent, or Firm* — Amin, Turocy & Watson, LLP

(57)            ABSTRACT

One or more systems, devices, computer program products and/or computer-implemented methods of use provided herein relate to training a learning model based on determined drift. A system can comprise a memory that stores computer executable components, and a processor that executes the computer executable components stored in the memory, wherein the computer executable components can comprise a selection component that can select an ensemble of deep learning regressors, and an identification component that can identify drift among the ensemble. An analysis component can analyze uncertainty samplings from the ensemble to determine a time instant when drift occurred. A training component can train one or more deep learning models, such as of the deep learning regressors, based upon the identified drift.

20 Claims, 10 Drawing Sheets
(1 of 10 Drawing Sheet(s) Filed in Color)

(56)         References Cited

U.S. PATENT DOCUMENTS

| | | | | |
|---|---|---|---|---|
| 8,498,950 | B2 | 7/2013 | Yankov et al. | |
| 9,311,609 | B2 | 4/2016 | Marcheret | |
| 9,390,086 | B2 | 7/2016 | Lisuk et al. | |
| 10,262,272 | B2 | 4/2019 | Chickering et al. | |
| 10,789,548 | B1 | 9/2020 | Yeganeh et al. | |
| 10,846,485 | B2 | 11/2020 | Bacarella et al. | |
| 2002/0147694 | A1 | 10/2002 | Dempsey et al. | |
| 2017/0330109 | A1* | 11/2017 | Maughan | G06N 5/04 |
| 2018/0240031 | A1 | 8/2018 | Huszar et al. | |
| 2019/0147357 | A1 | 5/2019 | Erlandson et al. | |
| 2020/0320440 | A1 | 10/2020 | Ashani et al. | |
| 2020/0401941 | A1 | 12/2020 | Miserendino et al. | |
| 2021/0182738 | A1* | 6/2021 | Ardis | G06N 7/01 |
| 2023/0123157 | A1* | 4/2023 | Ramanan | H04L 63/1425 |
| | | | | 706/12 |
| 2023/0124621 | A1* | 4/2023 | Umesh | G06F 21/552 |
| | | | | 726/23 |
| 2023/0126294 | A1* | 4/2023 | Tabet | G06N 3/08 |
| | | | | 706/12 |
| 2023/0129390 | A1* | 4/2023 | Fusco | G06N 5/01 |
| | | | | 706/12 |

OTHER PUBLICATIONS

Lindstrom, Patrick, Brian Mac Namee, and Sarah Jane Delany. "Drift detection using uncertainty distribution divergence." Evolving Systems 4 (2013): 13-25. (Year: 2013).*

Lu, Jie, et al. "Learning under concept drift: A review." IEEE transactions on knowledge and data engineering 31.12 (2018): 2346-2363. (Year: 2018).*

Liao, Jian-Wei, and Bi-Ru Dai. "An ensemble learning approach for concept drift." 2014 International Conference on Information Science & Applications (ICISA). IEEE, 2014. (Year: 2014).*

Mell et al., "The NIST Definition of Cloud Computing," Recommendations of the National Institute of Standards and Technology, NIST Special Publication 800-145, Sep. 2011, 7 pages.

Žliobaité et al., "Active learning with drifting streaming data." IEEE transactions on neural networks and learning systems 25, No. 1 (2013): 27-39.

Korycki et al., "Active learning with abstaining classifiers for imbalanced drifting data streams." In 2019 IEEE International Conference on Big Data (Big Data), pp. 2334-2343. IEEE, 2019.

* cited by examiner

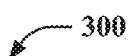
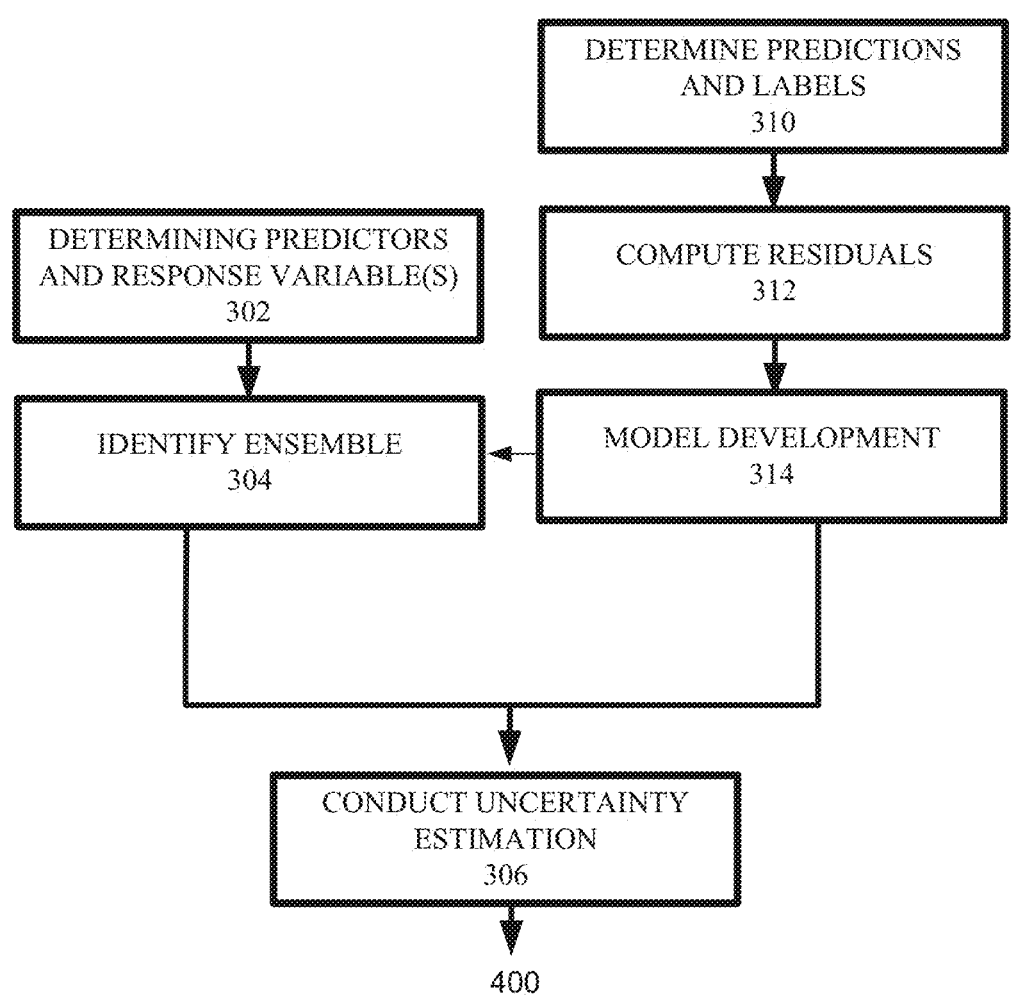
FIG. 3

500

400 (410)

| DETERMINE TIME OF DRIFT 502 | LABEL QUERY 504 |

DETERMINE TRAINING DATA
506

RETRAIN
508

COMPUTE NEW PREDICTION
510

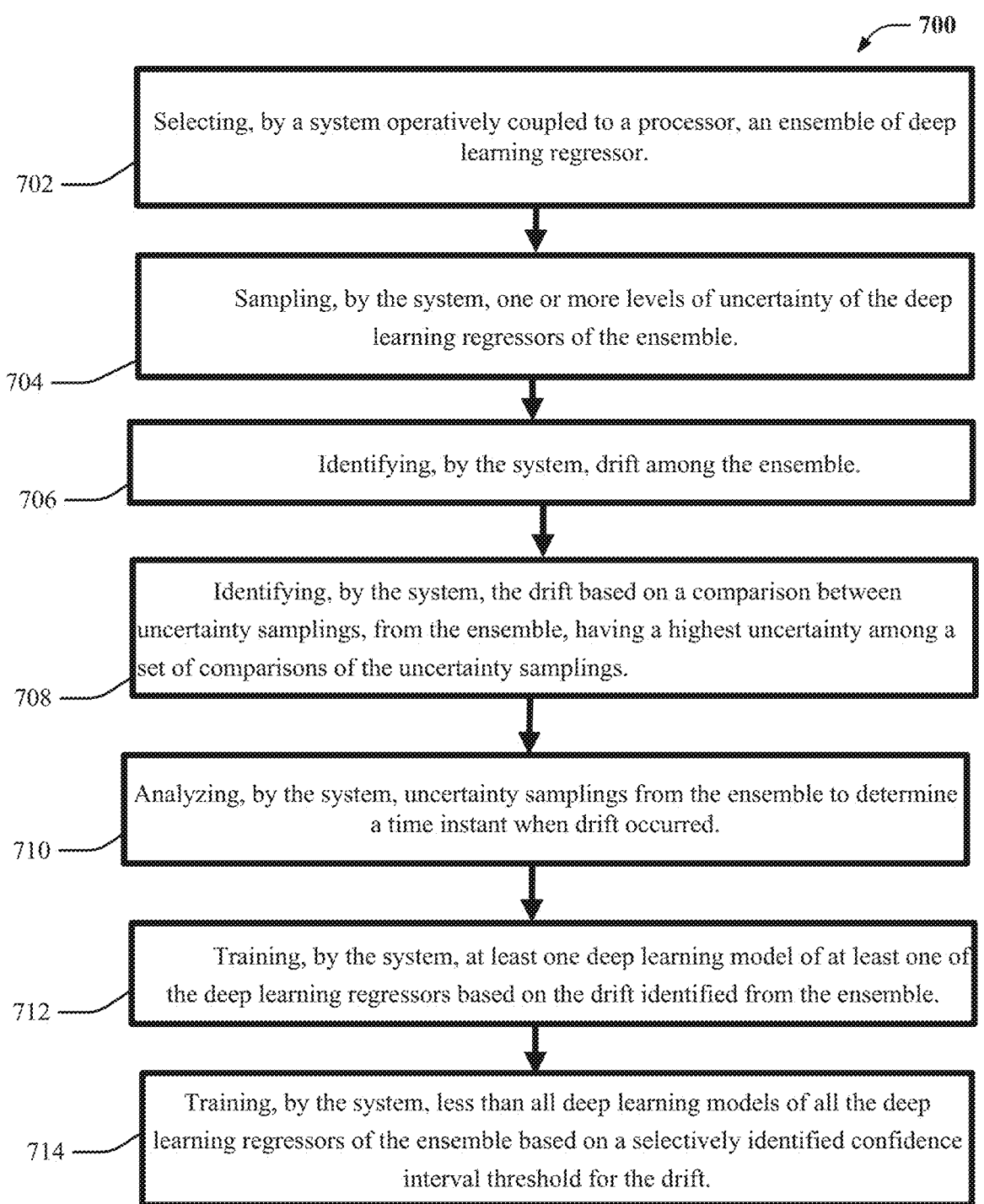

700

702 — Selecting, by a system operatively coupled to a processor, an ensemble of deep learning regressor.

704 — Sampling, by the system, one or more levels of uncertainty of the deep learning regressors of the ensemble.

706 — Identifying, by the system, drift among the ensemble.

708 — Identifying, by the system, the drift based on a comparison between uncertainty samplings, from the ensemble, having a highest uncertainty among a set of comparisons of the uncertainty samplings.

710 — Analyzing, by the system, uncertainty samplings from the ensemble to determine a time instant when drift occurred.

712 — Training, by the system, at least one deep learning model of at least one of the deep learning regressors based on the drift identified from the ensemble.

714 — Training, by the system, less than all deep learning models of all the deep learning regressors of the ensemble based on a selectively identified confidence interval threshold for the drift.

FIG. 7

ACTIVE LEARNING DRIFT ANALYSIS AND TRAINING

BACKGROUND

In the field of artificial intelligent computer systems, machine learning, a subset of artificial intelligence (AI), can employ algorithms to learn from data and create predictions based on this data. AI can learn from a data set to solve problems and to provide relevant recommendations. In some cases, AI can use self-teaching algorithms that use data minimum, visual recognition and/or natural language processing (NLP) to solve problems and to optimize processes.

Cognitive systems like AI can be inherently non-deterministic. Thus, data output from cognitive systems can be susceptible to information provided and used as input. For example, as new machine learning models are deployed, a system can extract same and/or different entities as previously. New models can affect prior results and/or previous models can affect new results. An error introduced through an input can result in extracting incorrect data and providing incorrect data as an output result.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. One or more embodiments described herein can be employed to address one or more deficiencies as indicated above. In one or more embodiments described herein, systems, computer-implemented methods, apparatus and/or computer program products can facilitate determination of drift presented by a machine learning model and further can facilitate training of the machine learning model based on analysis of the drift relative to an ensemble of deep learning regressors. For example, one or more embodiments described herein can be employed to address change in output results, such as reduction in accuracy of a prediction, from a machine learning model. This can facilitate favorable predictions over time and/or can facilitate such with reduced but more efficient training than in existing techniques.

In accordance with an embodiment, a system can comprise a memory that stores computer executable components, and a processor that executes the computer executable components stored in the memory, wherein the computer executable components comprise a selection component that selects an ensemble of deep learning regressors and an identification component that identifies drift among the ensemble.

In accordance with another embodiment, a computer-implemented method can comprise selecting, by a system operatively coupled to the processor, an ensemble of deep learning regressors; and identifying, by the system, drift among the ensemble.

In accordance with yet another embodiment, a computer program product facilitating semantic role labeling can comprise a computer readable storage medium having program instructions embodied therewith, the program instructions executable by a processor to cause the processor to select, by the processor, an ensemble of deep learning regressors and to identify, by the processor, drift among the ensemble.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 illustrates a high-level schematic diagram of one or more operations that can be performed by the non-limiting system of FIG. 2, in accordance with one or more embodiments described herein.

FIG. 7 illustrates a process flow for facilitating determination of drift presented by a machine learning model and for facilitating training of the machine learning model based on analysis of the drift relative to an ensemble of deep learning regressors, in accordance with one or more embodiments described herein.

DETAILED DESCRIPTION

Figure 1:
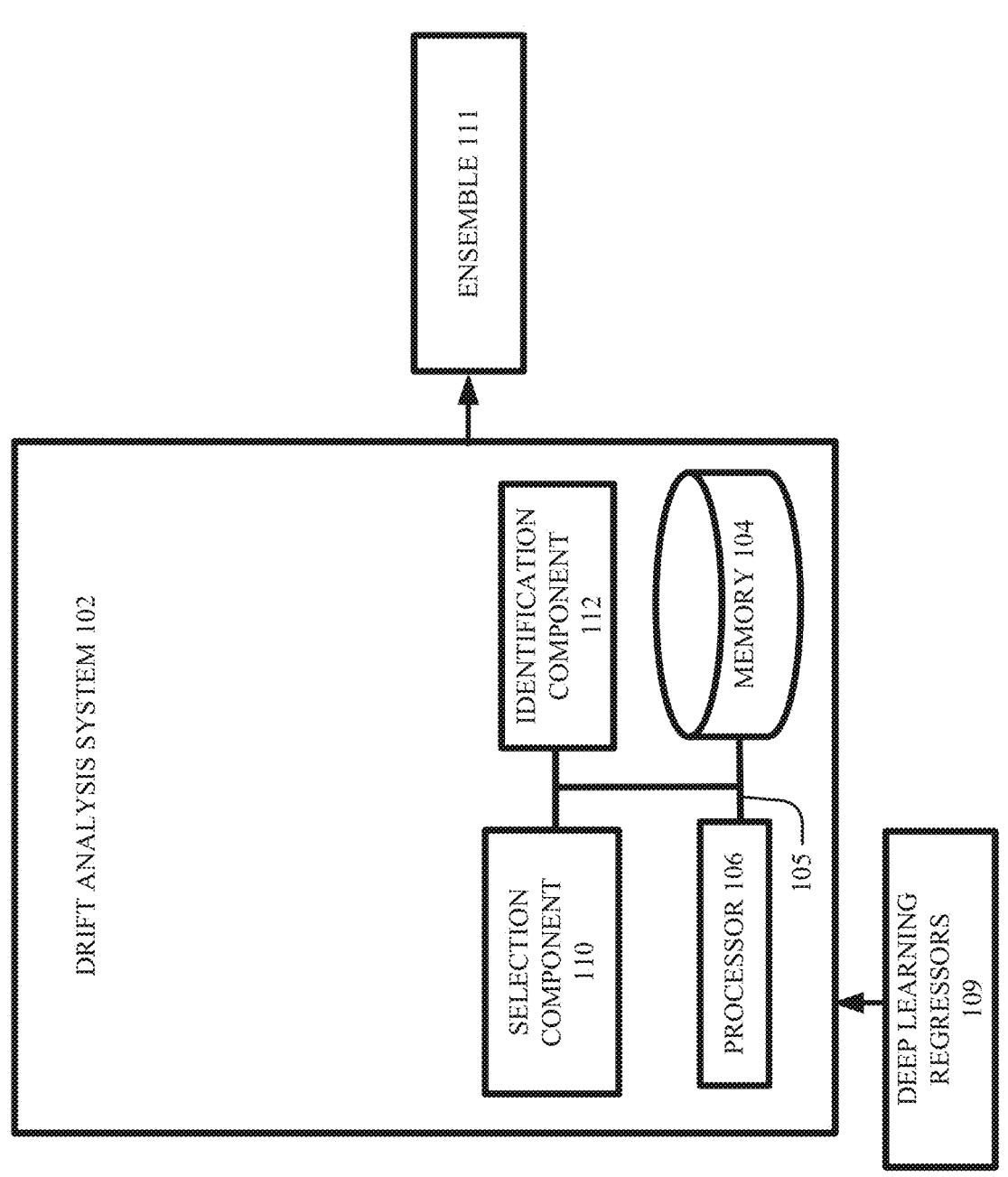
FIG. 1 illustrates a block diagram of an example, non-limiting system that can facilitate determination of drift presented by a machine learning model relative to an ensemble of deep learning regressors, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Described herein are one or more embodiments of a system, computer-implemented method and/or computer program product that can account for one or more deficiencies of exiting techniques for drift detection and training of a machine learning model. Generally, provided are one or more embodiments of a system, computer-implemented method and/or computer program product that can facilitate determination of drift presented by a machine learning model and further can facilitate training of the machine learning model based on analysis of the drift relative to an ensemble of deep learning regressors. That is, predictions of an ensemble of deep learning regressors having individual machine learning models can be employed. Training of one or more of the machine learning models can be facilitated where drift is detected relative to the ensemble, rather than individually relative to each machine learning model of each individual deep learning regressor.

Drift can be described as a relationship between a target variable and independent variables, which relationship can change with time. Due to this drift, a machine learning model, such as a deep learning model, can become unstable and/or one or more predictions from the machine learning model can become erroneous with time. Drift, also referred to as model drift, can include concept drift and/or data drift. Concept drift can be when statistical properties of a target variable itself changes, where the target variable is a variable being sought via a prediction of the respective machine learning model. Data drift can be when statistical properties of predictors, such as input variables, change. Change in underlying variables can include pattern changes in data due to seasonal changes, personal preferences and/or unpredicted events, for example.

Employing the one or more embodiments described herein, drift can be detected and categorized relative to an ensemble (e.g., a group) of two or more deep learning regressors, and thus relative to an ensemble of two or more machine learning models of those deep learning regressors. That is, each deep learning regressor can comprise and/or have associated therewith a machine learning model. Uncertainty sampling is performed for each machine learning model of the ensemble, which uncertainty sampling is employed to determine bounding prediction (e.g., target variable) values for individual machine learning models.

Generally, based on aggregated prediction results for the varying ensemble machine learning models, a determination is made as to whether drift is present relative to the ensemble, such as relative to the ensemble as a whole. Where drift is detected, one or more machine learning models, such as those exhibiting drift and/or a selectively determined level of drift, can be trained, such as based on selectively determined training data. In this way, overabundance of retraining/training can be avoided, and knowledge across an ensemble of deep learning regressors can be leveraged, such as employing sequence to sequence learning. Put another way, number of retrainings or trainings can be limited and performed only in case(s) of presence of drift that meets a selectively determined criteria provided by a selectively determined threshold.

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
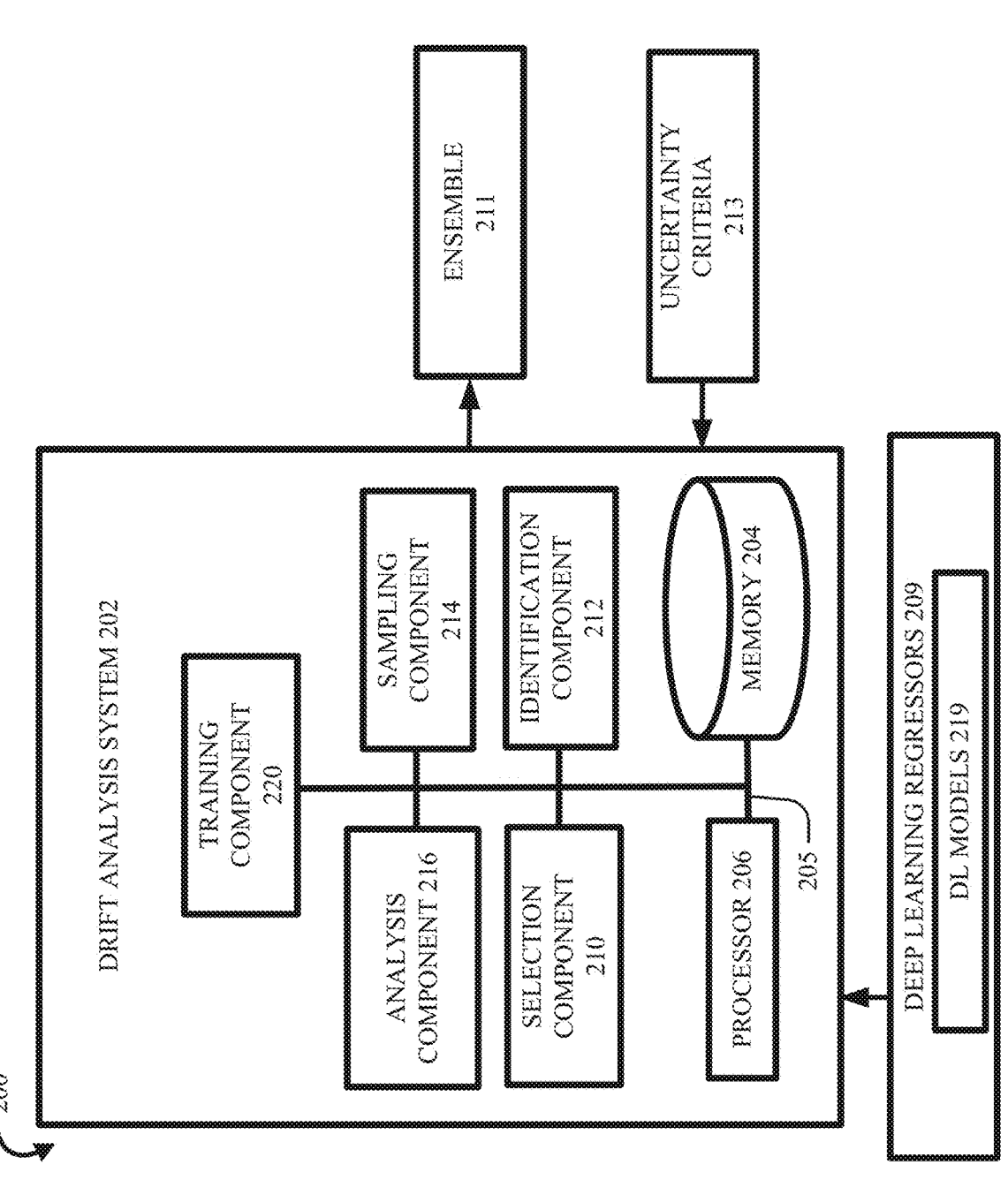
FIG. 2 illustrates a block diagram of another example, non-limiting system that can facilitate determination of drift presented by a machine learning model and further can facilitate training of the machine learning model based on analysis of the drift relative to an ensemble of deep learning regressors, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the operating environment 800 illustrated at FIG. 8. In one or more described embodiments, computer and/or computing-based elements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more devices, systems and/or apparatuses that can facilitate semantic role labeling across two or more different languages. For example, FIG. 1 illustrates a block diagram of an example, non-limiting system 100 that can determine semantic relationships of argument labels provided in two or more different languages. The semantic relationships can be defined based on projection from any one language to any one or more other languages.

At FIG. 1, illustrated is a block diagram of an example, non-limiting system 100 that can facilitate a process for determining semantic relationships, in accordance with one or more embodiments described herein. While referring here to one or more processes, facilitations and/or uses of the non-limiting system 100, description provided herein, both above and below, also can be relevant to one or more other non-limiting systems described herein, such as the non-limiting system 200, to be described below in detail.

As illustrated at FIG. 1, the non-limiting system 100 can comprise drift analysis system 102. Drift analysis system 102 can comprise one or more components, such as a memory 104, processor 106, bus 105, selection component 110 and/or identification component 112. Generally, drift analysis system 102 can facilitate identification of drift among an ensemble 111 of deep learning regressors 109. Individual deep learning regressors 109 can comprise individual machine learning (ML) models, such as deep learning (DL) models.

The selection component 110 can select two or more deep learning regressors 109, such as from a plurality of deep learning regressors 109. The deep learning regressors 109 can be discoverable by and/or connected to the drift analysis system 102 by any suitable means. The selection component 110 can identify the selected deep learning regressors 109 as the ensemble 111. In one or more embodiments, a parent system comprising the drift analysis system 102 also can comprise one or more of the deep learning regressors 109.

Communication between the deep learning regressors 109 and the drift analysis system 102 can be by any suitable means. One or more communications between one or more components of the non-limiting system 100, and/or between a deep learning regressor 109 and the non-limiting system 100, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

The identification component 112 can generally identify drift among the ensemble 111. That is, the drift analysis system 102 can analyze predictions of individual ones of the deep learning regressors 109, such as relative to one or more common target variables, and can employ those predictions to determine if drift is present among at least two or more deep learning regressors 109 of the ensemble 111. The employing of the predictions can include one or more of a comparison of predictions against one another, aggregate of predictions, comparison of predictions relative to one or more thresholds, analysis of the set of predictions (of the ensemble 111) as a whole and/or the like.

One or more aspects of a component (e.g., the selection component 110 and/or identification component 112) can be employed separately and/or in combination, such as employing one or more of a memory or a processor of a system that includes the component to thereby facilitate compilation of an ensemble 111 and/or detection of drift. These components can employ the processor 106 and/or the memory 104. Additionally and/or alternatively, the processor 106 can execute one or more program instructions to cause the processor to perform one or more operations by these components.

Turning next to FIG. 2, the figure illustrates a diagram of an example, non-limiting system 200 that can facilitate a process for determining semantic relationships, in accordance with one or more embodiments described herein. Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a drift analysis system 202. The drift analysis system 202, as illustrated, can comprise any suitable type of component, machine, device, facility, apparatus and/or instrument that comprises a processor and/or can be capable of effective and/or operative communication with a wired and/or wireless network. All such embodiments are envisioned. For example, drift analysis system 202 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/ or another type of device and/or computing device. Likewise, the drift analysis system 202 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The drift analysis system 202 can be associated with, such as accessible via, a cloud computing environment. For example, the drift analysis system 202 can be associated with a cloud computing environment 950 described below with reference to FIG. 9 and/or with one or more functional abstraction layers described below with reference to FIG. 10 (e.g., hardware and software layer 1060, virtualization layer 1070, management layer 1080 and/or workloads layer 1090).

Operation of the non-limiting system 200 and/or of the drift analysis system 202 is not limited to detection of a single drift instance and/or to training of a single ML model. Rather, operation of the non-limiting system 200 and/or of the drift analysis system 202 can be scalable. For example, the non-limiting system 200 and/or the drift analysis system 202 can facilitate determination of one or more drift instances and/or can train more than one ML model based on a single or plural detected drift instances, such as at a time.

The drift analysis system 202 can comprise a plurality of components. The components can include a memory 204, processor 206, bus 205, selection component 210, identification component 212, sampling component 214, analysis component 216 and/or training component 220. Like the drift analysis system 102, the drift analysis system 202 can be operated to compile an ensemble 211 of deep learning regressors 209, to detect one or more instances of drift, and/or to train one or more ML models, such as DL models 219. Individual deep learning regressors 209 can comprise individual one or more of the DL models 219, and thus the ensemble 211 also can comprise a group of DL models 219.

One or more communications between one or more components of the non-limiting system 200, and/or between a DL regressor 209 and the non-limiting system 200, can be facilitated by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion now turns to the processor 206, memory 204 and bus 205 of the drift analysis system 202.

For example, in one or more embodiments, drift analysis system 202 can comprise a processor 206 (e.g., computer processing unit, microprocessor, classical processor, quantum processor and/or like processor). In one or more embodiments, a component associated with drift analysis system 202, as described herein with or without reference to the one or more figures of the one or more embodiments, can comprise one or more computer and/or machine readable, writable and/or executable components and/or instructions that can be executed by processor 206 to facilitate performance of one or more processes defined by such component(s) and/or instruction(s). In one or more embodiments, the processor 206 can comprise selection component 210, identification component 212, sampling component 214, analysis component 216 and/or training component 220.

In one or more embodiments, the drift analysis system 202 can comprise a computer-readable memory 204 that can be operably connected to the processor 206. The memory 204 can store computer-executable instructions that, upon execution by the processor 206, can cause the processor 206 and/or one or more other components of the drift analysis system 202 (e.g., selection component 210, identification component 212, sampling component 214, analysis component 216 and/or training component 220) to perform one or more actions. In one or more embodiments, the memory 204 can store computer-executable components (e.g., selection component 210, identification component 212, sampling component 214, analysis component 216 and/or training component 220).

Drift analysis system 202 and/or a component thereof as described herein, can be communicatively, electrically, operatively, optically and/or otherwise coupled to one another via a bus 205 to perform functions of non-limiting system 200, drift analysis system 202 and/or one or more components thereof and/or coupled therewith. Bus 205 can comprise one or more of a memory bus, memory controller, peripheral bus, external bus, local bus, quantum bus and/or another type of bus that can employ one or more bus architectures. One or more of these examples of bus 205 can be employed to implement one or more embodiments described herein.

In one or more embodiments, drift analysis system 202 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the non-limiting system 200 can reside in the cloud, and/or can reside locally in a local computing environment (e.g., at a specified location(s)).

In addition to the processor 206 and/or memory 204 described above, drift analysis system 202 can comprise one or more computer and/or machine readable, writable and/or executable components and/or instructions that, when executed by processor 206, can facilitate performance of one or more operations defined by such component(s) and/or instruction(s).

Turning now to the selection component 210, the selection component can select two or more deep learning regressors 209, such as from a plurality of deep learning regressors 209. The deep learning regressors 209 can be discoverable by and/or connected to the drift analysis system 202 by any suitable means. The selection component 210 can identify the selected deep learning regressors 209 as the ensemble 211. In one or more embodiments, a parent system comprising the drift analysis system 202 also can comprise one or more of the deep learning regressors 209.

The deep learning regressors 209 can comprise ML models 219 that are constructed to employ varying learning methods, such as comprising one or more of long short-term memory (LSTM), gated recurrent units (GRU), convolutional neural network (CNN) and transformer models.

In one or more embodiments, one or more of the deep learning regressors 209 can employ sequence to sequence learning. Sequence to sequence learning can employ any algorithm that takes a sequence as input, such as a time series, and produces a sequence as output. Employing sequence to sequence learning can allow an ML model 219 to model time series data. In one embodiment, one or more, such as all ensemble members can employ sequence to sequence learning.

The identification component 212 can generally identify drift among the ensemble 211. That is, the drift analysis system 202 can analyze predictions of individual ones of the deep learning regressors 209, such as relative to one or more common target variables, and can employ those predictions to determine if drift is present among at least two or more deep learning regressors 209 of the ensemble 211. The employing of the predictions can include one or more of a comparison of predictions against one another, aggregate of predictions, comparison of predictions relative to one or more thresholds, analysis of the set of predictions (of the ensemble 211) as a whole and/or the like.

Generally, the deep learning regressors 209 can provide prediction of the residuals. First, predictions of the response variables can be determined, and then the residuals can be computed. Subsequently, those prediction residuals can be considered as regressors and can be fit to a respective ML model 219. Afterwards, the uncertainty of the estimation can be determined.

More particularly, prior to identification of drift, the sampling component 214 can perform uncertainty sampling, such as via one or more different uncertainty estimation approaches. For example, in an embodiment, the sampling component 214 can perform an uncertainty estimation algorithm such as Equation 1:

$$ue=sqrt(abs(pr)), \qquad [1]$$

where ue is the uncertainty estimation being sought and pr is one or more prediction residuals for the particular ML model 219 being analyzed by the sampling component 214. An uncertainty estimation can be an interval of values within which a true value, or ground truth, is estimated to lie with a stated probability.

A prediction residual (e.g., present error of an ML model 219) can be and/or can comprise one or more differences between observed and predicted values of data. For example, in absence of drift, prediction residuals can be equal to zero or near to zero. The respective values of the prediction residuals can change in the presence of drift, as reflected by a higher estimated uncertainty, as compared to prediction residuals in the absence of drift.

The one or more prediction residuals for each ML model 219 being analyzed by the sampling component 214 can first be computed from the deep learning regressors. For example, the squared residuals at a time t can be represented by Equation 2:

$$R\_\{t\}=(y\{t\}-y\_estimation\_\{t\})^2, \qquad [2]$$

where $R\_\{t\}$ is the squared residuals being sought, $y\{t\}$ can be the response variable (true output), and y estimation $\{t\}$ can be the output (estimated) computed by the ML model 219. The same data that is employed to determine the squared residuals can be employed to model the squared residuals. Subsequently, upcoming data can be employed to compute a prediction based on the residuals, for a particular ML model 219. Upcoming data can comprise data that was not employed for the training and/or to generate the particular ML model 219. This can be completed for each ML model 219 of the ensemble 211.

Using these one or more uncertainty estimation approaches, the uncertainty estimation can be obtained and can be employed to calculate, such as by the sampling component 214, upper and lower uncertainty bounds against which a prediction calculated by the particular ML model 219 can be compared. That is, the upper and lower uncertainty bounds can be calculated for each ML model 219 being employed in the ensemble.

These upper and lower uncertainty bounds can be employed to determine whether or not a prediction of a target variable for an ML model 219 is within a determined confidence level range, and thus whether drift exists for the particular ML model 219. However, it is noted that while drift can be present for any one particular ML model 219 of the ensemble 211, ensemble drift is determined based on an aggregated approach relative to one or more ML models 219 together in the group. In this way, excessive re-training can be avoided and thus less computing time and power employed.

In an embodiment, an upper uncertainty bound can be calculated according to Equation 3, and a lower uncertainty bound can be calculated according to Equation 4:

$$uub=pr+(ue*conf\_lvl*pr), \quad [3]$$

where uub is the upper uncertainty bound being sought, and $$lub=pr-(ue*conf\_lvl*pr), \quad [4]$$

where lub is the lower uncertainty bound being sought. Further, each of the uub and lub is based upon a confidence interval or confidence level that can be selectively determined by the drift analysis system 202 and/or input by an entity. In one or more embodiment, a confidence threshold can comprise a confidence range having an upper confidence bound and a lower confidence bound.

In one or more other embodiments, although identified as part of the ensemble 211, one or more deep learning regressors 209/ML models 219 can be bypassed during uncertainty sampling, such as where these one or more deep learning regressors 209/ML models 219 will not be employed by one or more other components of the drift analysis system 202 to detect drift and/or to be retrained/trained. Likewise, uub and lub will not be calculated for such one or more deep learning regressors 209/ML models 219.

Upon calculation of the upper and lower uncertainty bounds, the analysis component 216, for each individual ML model 219 of the ensemble being analyzed, can compare the ML model prediction against the respective upper and lower uncertainty bounds calculated for the ML model 219. For example, where a prediction is outside of the upper and lower bounds calculated, drift can be possible and/or present at the respective ML model 219. The ML model 219 thus can be identified as a member of the ensemble 211 experiencing drift. Depending on the embodiment, one, both or neither of the upper and lower bounds can be included in the bin labeled as exhibiting drift.

Thereafter, the analysis component 216 can generally exploit the uncertainty data obtained via the sampling component 214 to determine whether ensemble-based drift is present. For example, in one or more embodiments, a notion of voting can be employed. The analysis component 216 can recognize the one or more ML models 219 having been identified as exhibiting drift. In an embodiment, where a majority of the ensemble DL regressors 209/ML models 219 exhibit drift, the ensemble as a whole can be identified as exhibiting drift. In another example, based on one or more comparisons between the uncertainty samplings of members of the ensemble, drift can be identified for those one or more members having a highest uncertainty among a set of comparisons of the uncertainty samplings. In such case, an uncertainty threshold and/or member quantity threshold can be selectively employed, such as by the drift analysis system 202 and/or an administrating entity, for example. In another example, one or more members of the ensemble exhibiting a highest deviation from the upper and lower prediction bounds can be identified as exhibiting drift, and/or where a selectively determined deviation and/or number of deviated members is reached, ensemble drift can be identified. Any combination of the above examples can be employed to determine ensemble-based drift.

That is generally, the ensemble-based drift can be based on a method that compares, analyzes, compiles and/or aggregates uncertainty and/or prediction levels of plural members of an ensemble to determine whether ensemble drift is present and/or to determine which members are to be identified as exhibiting drift (e.g., most exacerbated drift) and thus are to be trained and/or retrained. That is, the ensemble approach can allow strengthening the accuracy and/or robustness of drift detection. Put another way, the query by committee approach to selective sampling allows for disagreement amongst an ensemble of hypotheses to be used to select data for labeling, such as for training.

In one or more embodiments, the analysis component 216 can operate on and/or employ one or more data streams, such as employing a stream-based querying approach.

The analysis component 216 also can analyze uncertainty samplings from the ensemble 211 (e.g., from the ML models 219 of the ensemble 211), to determine a time instant and/or time range when drift occurred. For example, such time can be relative to individual ML models 219 or can be aggregated in any suitable manner relative to those members of an ensemble identified as exhibiting drift (and/or as identified for training/retraining). In one example, an earliest time of any member and/or of any member designated for training/retraining can be employed as a common earliest time instant of drift start. Likewise, a latest time of any member and/or of any member designated for training/retraining can be employed as a common latest time instant of drift end.

Turning now to the training component 220, depending on the selected method of selecting data for training, the training component 220 can determine a dataset for use in commonly retraining/training each member designated for training/retraining of the ensemble. Alternatively, the training component 220 can determine individual datasets for use in retraining/training one or more individual members of the ensemble.

In an embodiment, data, such as ground truth data, from one or more members of the ensemble during the time of drift can be employed for training. Ground truth can be a domain knowledge and can correspond to absence of drift. For example, this can be data from one or more members that have not been identified as experiencing drift and/or one or more members that have been identified as experiencing drift. In one or more embodiments, data from before and/or after the identified drift period can be employed and/or given precedence.

Ground truth data employed for training/retraining can be common for each member designated for training/retraining of the ensemble. Alternatively, the training component 220 can determine individual ground truth data for use in retraining/training one or more individual members of the ensemble. In one or more embodiments, ground truth data can be determined for a subset, such as a region, of the ensemble members.

Further, the training component 220, and/or another component, can query the label of unlabeled data to update the model. The labels can comprise output data, and can be employed to validate the predictions and/or to compute uncertainty. This can include querying from an oracle (information source) to label data with an actual output data. The querying can be employed to determine the set of training data, such as by recording and/or saving the actual output data.

Upon determination of the training data set, one or more ML models 219 of the DL regressors 209 can automatically be retrained and/or trained, such as by the training component 220. That is, by being identified as exhibiting drift, the one or more members of the ensemble can be likewise identified, such as by the identification component 212 for automatic training/retraining by the training component 220. Indeed, less than all members of the ensemble 211 can be trained on a training data set. This can allow for limiting the amount of time, processing power, memory and/or the like employed for training members of the ensemble 211.

In one or more embodiments, a new ML model of a new or existing DL regressor can be added to the ensemble 211 and trained based on the determined training data set.

Figure 4:
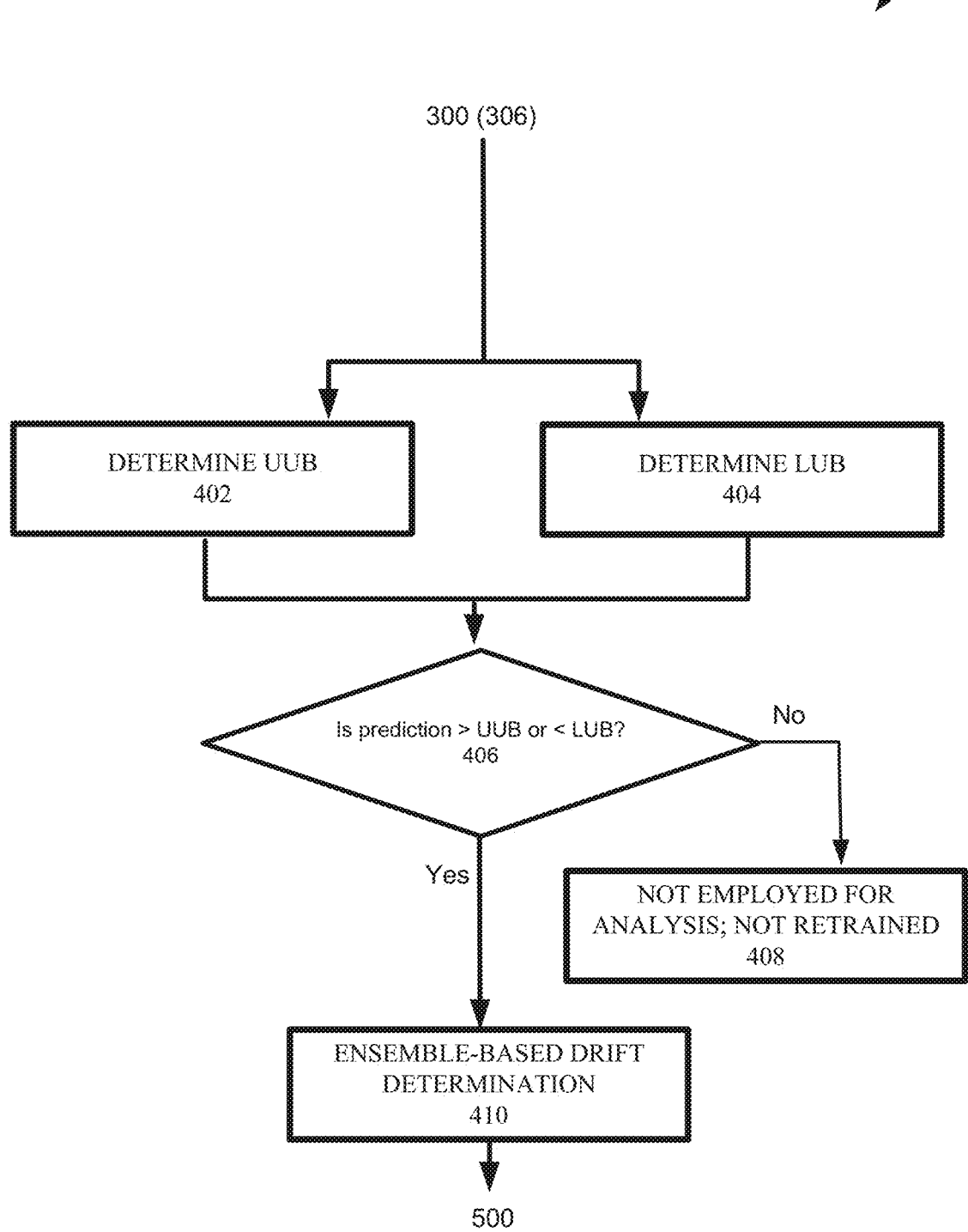
FIG. 4 illustrates a continuation of the schematic diagram of FIG. 3, in accordance with one or more embodiments described herein.
Figure 5:
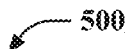
FIG. 5 illustrates a continuation of the schematic diagram of FIG. 4, in accordance with one or more embodiments described herein.

Referring next to FIGS. 3-5 together, illustrated is a process flow split into process flow portions 300, 400 and 500. The illustrated process flow can facilitate ensemble-based drift detection and/or training/retraining of one or more members of the ensemble of DL regressors. Description is provided in accordance with one or more embodiments described herein, such as the non-limiting 200 of FIG. 2. While the process flow portions are described relative to the non-limiting system 200 of FIG. 2, the process flow portions can be applicable also to other systems described herein, such as the non-limiting system 100 of FIG. 1. Repetitive description of like elements and/or processes employed in respective embodiments is omitted for sake of brevity.

At 302, the drift analysis system 202 can comprise determining one or more predictors and/or response variables that can serve as input to the one or more DL regressors 209.

At 304, the drift analysis system 202 (e.g., the selection component 210) can identifying plural DL regressors 209 for an ensemble 211, and thus the ensemble 211 can be identified.

At 306, the drift analysis system 202 can comprise conducting uncertainty estimation on one or more of the members of the ensemble 211, such as on each of the members of the ensemble 211, such as by the sampling component 214.

At 310, the drift analysis system 202 can comprise determining predictions and/or labels to employ as input for model development.

At 312, the drift analysis system 202 can comprise computing residuals based on the input data.

At 314, the drift analysis system 202 can comprise developing the one or more ML models 219 that can be selected for the ensemble 211.

At 402, the drift analysis system 202 can comprise determining the UUB, such as based on the aforementioned Equation 3, such as by the analysis component 216.

At 404, the drift analysis system 202 can comprise determining the LUB, such as based on the aforementioned Equation 4, such as by the analysis component 216.

At 406, the drift analysis system 202 can comprise determining whether a prediction for individual ML models 219 meets the individual UUB and LUB for the respective models 219. For example, the decision can comprise determining by the analysis component 316 whether a prediction is greater than the UUB or less than the LUB. If the answer is yes, the process can proceed to operation 410. If the answer is no, the process can proceed instead to operation 408.

At 408, the drift analysis system 202 can comprise identifying the member of the ensemble 211 as not being employed for further analysis, and thus as not being designated for training/retraining.

At 410, the drift analysis system 202 can comprise conducting an ensemble-based drift determination, such as by the identification component 212 in concert with the analysis component 216.

At 502, the drift analysis system 202 can comprise determining a time of drift, such as by the analysis component 216.

At 504, the drift analysis system 202 can comprise querying one or more labels, such as at one or more oracles.

At 506, the drift analysis system 202 can comprise determining, such as by the training component 220, a training data set, such as based on the determined time of drift and/or label querying.

At 508, the drift analysis system 202 can comprise training and/or retraining, such as by the training component 220, one or more ML models 219 of the ensemble 211.

At 510, the drift analysis system 202 can comprise computing one or more new predictions, such as employing the trained/retrained ML models 219.

Furthermore, in one or more embodiments, the processor 206 and/or the analysis component 216, for example, can be configured to detect when a drift analysis system 202 is being employed. For example, the analysis component 216 and/or training component 220 can provide data and/or training in a manner that can be recognized, such as including one or more arbitrary determinations usable for identification of the drift analysis system 202 only.

Figure 6:
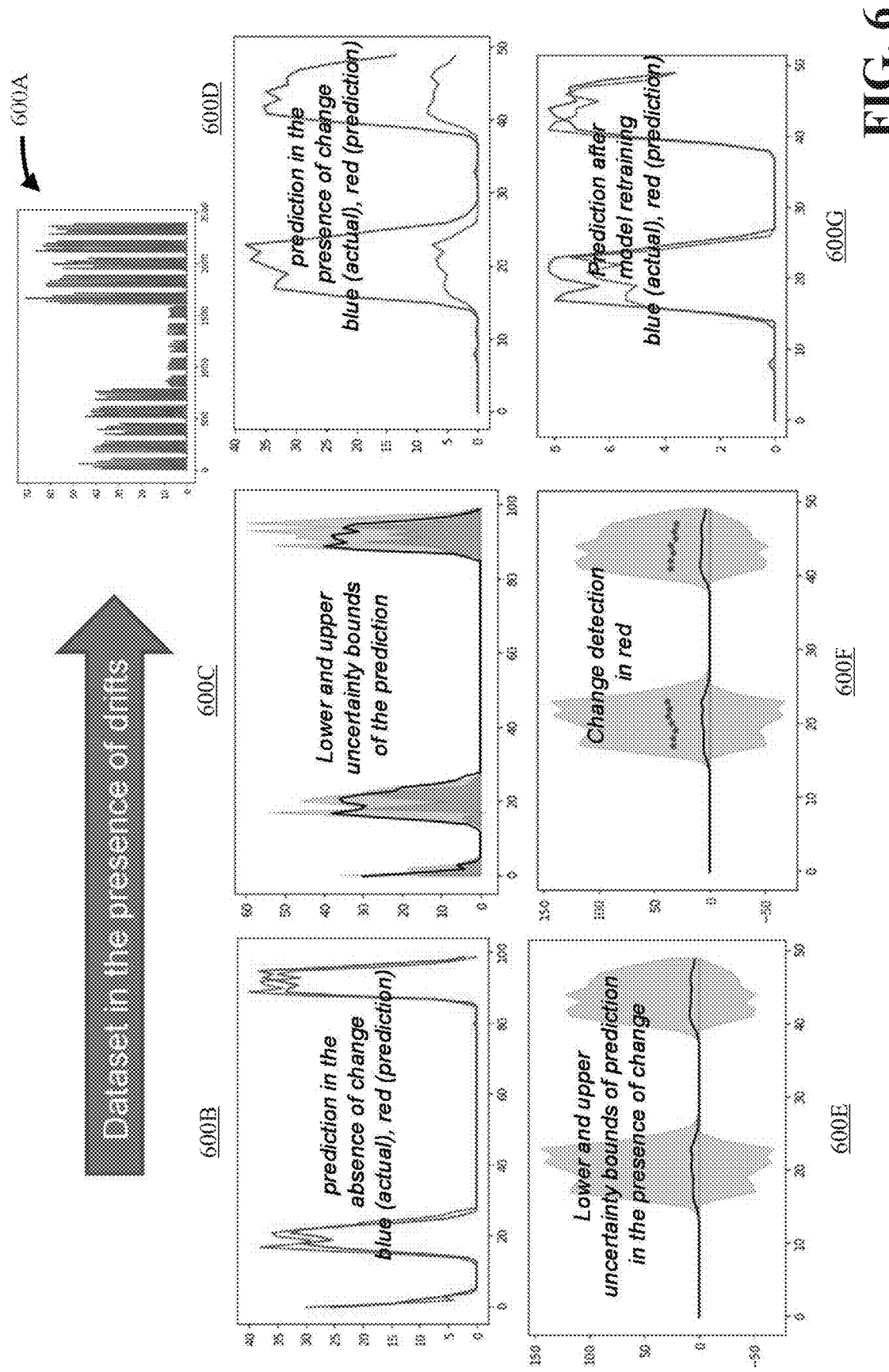
FIG. 6 illustrates a set of plots corresponding to one or more operations of the schematic diagrams of FIGS. 3-5, in accordance with one or more embodiments described herein.

Looking now to FIG. 6, depicted are a set of seven plots that illustrate actual data (in blue) vs. prediction data (in red) in presence of drift, during one or more operations performed by the drift analysis system 202 and after model retraining.

Plot 600A illustrates a dataset in the presence of drift. Observed are three different sets of behaviors with different amplitudes. Plot 600B illustrates prediction data in red as compared to actual data in blue, absent any change over time, such as relative to no drift. Generally, actual data and prediction data match, and thus drift is not exhibited. Plot 600C illustrates lower and upper uncertainty bounds of the plotted prediction. Plot 600D illustrates the prediction data in red in the presence of change, such as drift, as compared to the actual data in blue. Plot 600E illustrates upper and lower uncertainty bounds of prediction in the presence of the change. Plot 600F illustrates change (e.g., drift) detection in red. Using the data provided at plot 600F, model retraining can be conducted, resulting in the data at plot 600G. Plot 600G illustrates the prediction data in red as compared to the actual data in blue after model retraining in response to the drift detection.

Next, FIG. 7 illustrates a flow diagram of an example, non-limiting method 700 that can facilitate training of a learning model based on determined drift, in accordance with one or more embodiments described herein, such as the non-limiting 200 of FIG. 2. While the non-limiting method 700 is described relative to the non-limiting system 200 of FIG. 2, the non-limiting method 700 can be applicable also to other systems described herein, such as the non-limiting system 100 of FIG. 1. Repetitive description of like elements and/or processes employed in respective embodiments is omitted for sake of brevity.

At 702, the non-limiting method 700 can comprise selecting, by a system operatively coupled to a processor (e.g., selection component 210), an ensemble of deep learning regressors.

At 704, the non-limiting method 700 can comprise sampling, by the system (e.g., sampling component 214), one or more levels of uncertainty of the deep learning regressors of the ensemble.

At 706, the non-limiting method 700 can comprise identifying, by the system (e.g., identification component 212), drift among the ensemble.

At 708, the non-limiting method 700 can comprise identifying, by the system (e.g., analysis component 216), the drift based on a comparison between uncertainty samplings, from the ensemble, having a highest uncertainty among a set of comparisons of the uncertainty samplings.

At 710, the non-limiting method 700 can comprise analyzing, by the system (e.g., analysis component 216), uncertainty samplings from the ensemble to determine a time instant when drift occurred.

At 712, the non-limiting method 700 can comprise training, by the system (e.g., training component 220), at least one deep learning model of at least one of the deep learning regressors based on the drift identified from the ensemble.

At 714, the non-limiting method 700 can comprise training, by the system (e.g., training component 220), less than all deep learning models of all the deep learning regressors of the ensemble based on a selectively identified confidence interval threshold for the drift.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

In summary, one or more systems, devices, computer program products and/or computer-implemented methods of use provided herein relate to training a learning model based on determined drift. A system can comprise a memory that stores computer executable components, and a processor that executes the computer executable components stored in the memory, wherein the computer executable components can comprise a selection component that can select an ensemble of deep learning regressors, and an identification component that can identify drift among the ensemble. An analysis component can analyze uncertainty samplings from the ensemble to determine a time instant when drift occurred. A training component can train one or more deep learning models, such as of the deep learning regressors, based upon the identified drift.

In summary, generally the ensemble is employed to stabilize the models of a particular region, such as a region presenting drift. The models presenting drift can be stabilized, such as be training and/or retraining those models. The training can be based on data before, after and/or during the occurrence of drift, depending on the data. Such data can include ground truth data for one or more models and/or for the region presenting drift.

An advantage of the aforementioned systems, computer-implemented methods and/or computer program products can be limiting of retraining based on ensemble-based data. That is, based on drift present relative to an ensemble-based threshold, one or more ML models can be trained and/or retrained, as compared to continuous retraining of individual models after each iteration, according to a set frequency, and/or according to individually-determined individual model drift.

That is, drift detection, drift analysis and/or retraining in response to drift detection and/or analysis can be made efficient, automatic, cost-effective and/or more accurate than with existing technologies and/or approaches, such as by leveraging an ensemble of DL approaches. That is by including varying DL approaches from various ML models (such as DL models) in an ensemble, models can benefit from varied predictions and/or uncertainty samplings.

Indeed, in view of the one or more embodiments described herein, a practical application of the systems, computer-implemented methods and/or computer program products described herein can be generating/training models that can produce more accurate forecasting, even in the presence of ever-changing and/or unpredicted underlying variables. Overall, such computerized tools can constitute a concrete and tangible technical improvement in the field of artificial intelligence forecasting and/or deep learning or active learning forecasting.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to model forecasting and/or predictions, as compared to existing systems and/or techniques. Systems, computer-implemented methods and/or computer program products facilitating performance of these processes are of great utility in the field of active computer-based learning and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively train a computerized model (e.g., AI model, ML model and/or DL model) band/or detect drift based on residuals, predictions and uncertainty sampling as the one or more embodiments described herein can facilitate this process. And, neither can the human mind nor a human with pen and paper electronically effectively train a computerized model (e.g., AI model, ML model and/or DL model) band/or detect drift based on residuals, predictions and uncertainty sampling, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations described herein.

Figure 8:
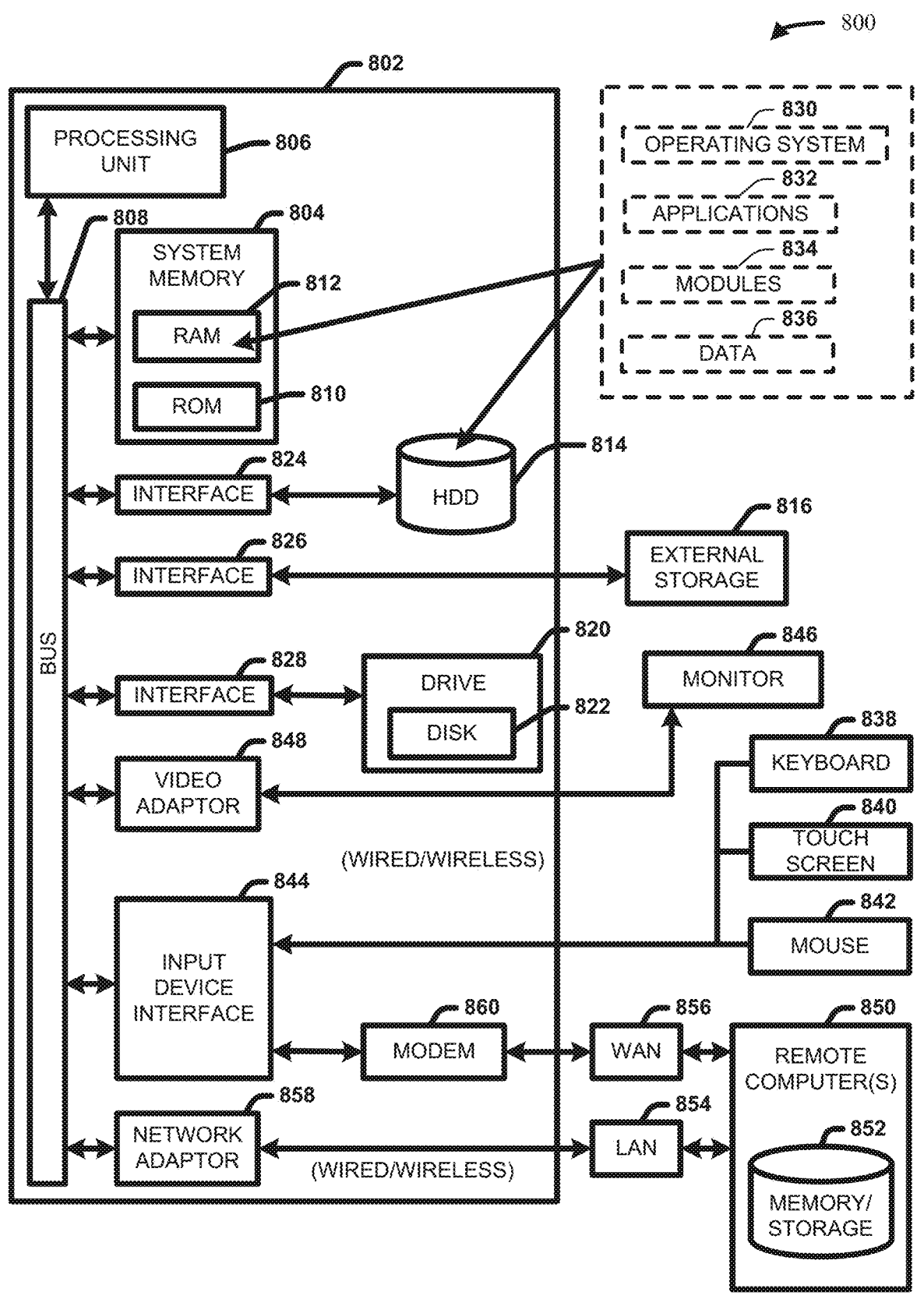
FIG. 8 illustrates a block diagram of an example, non-limiting, operating environment in which one or more embodiments described herein can be facilitated.
Figure 9:
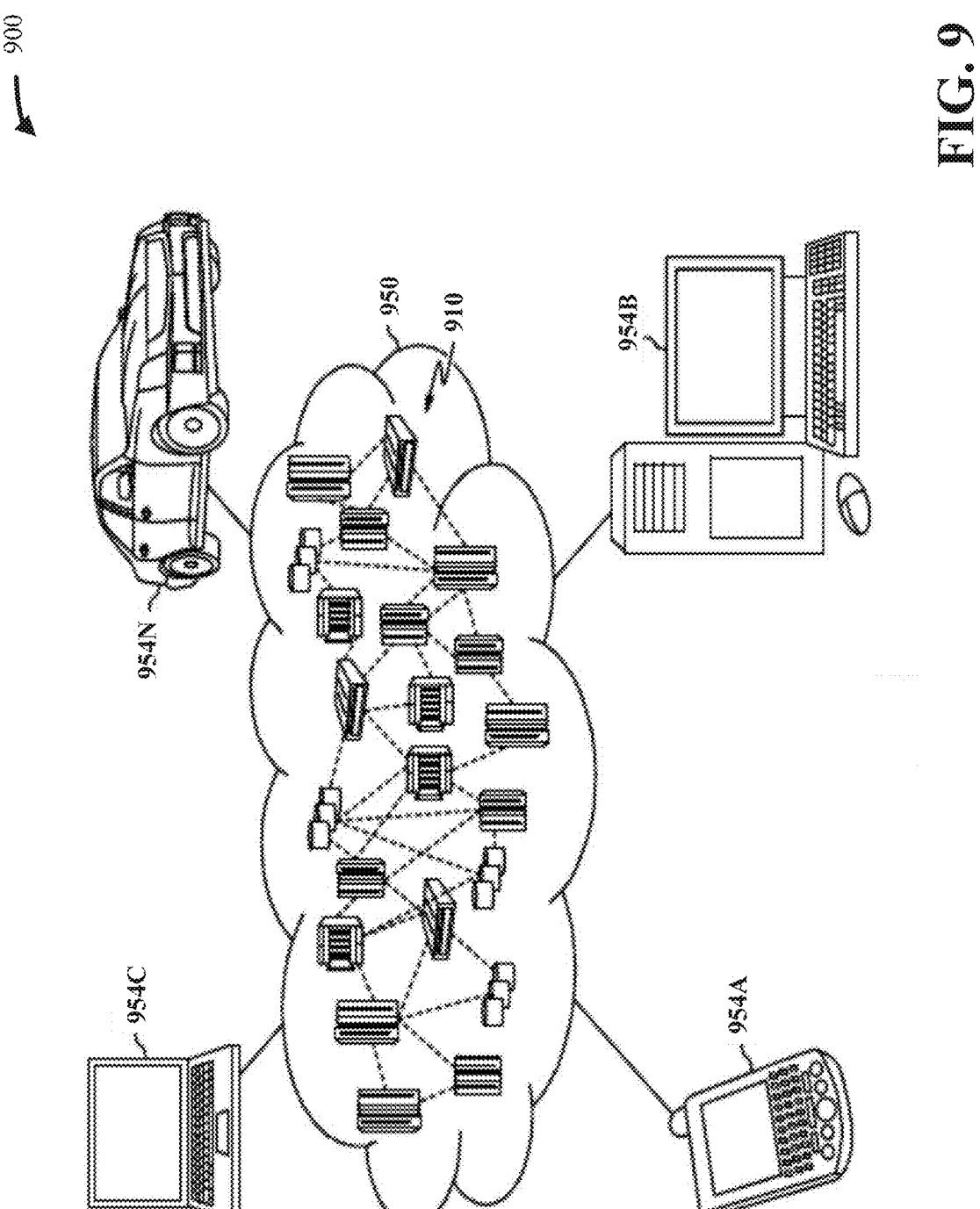
FIG. 9 illustrates a block diagram of an example, non-limiting, cloud computing environment in accordance with one or more embodiments described herein.
Figure 10:
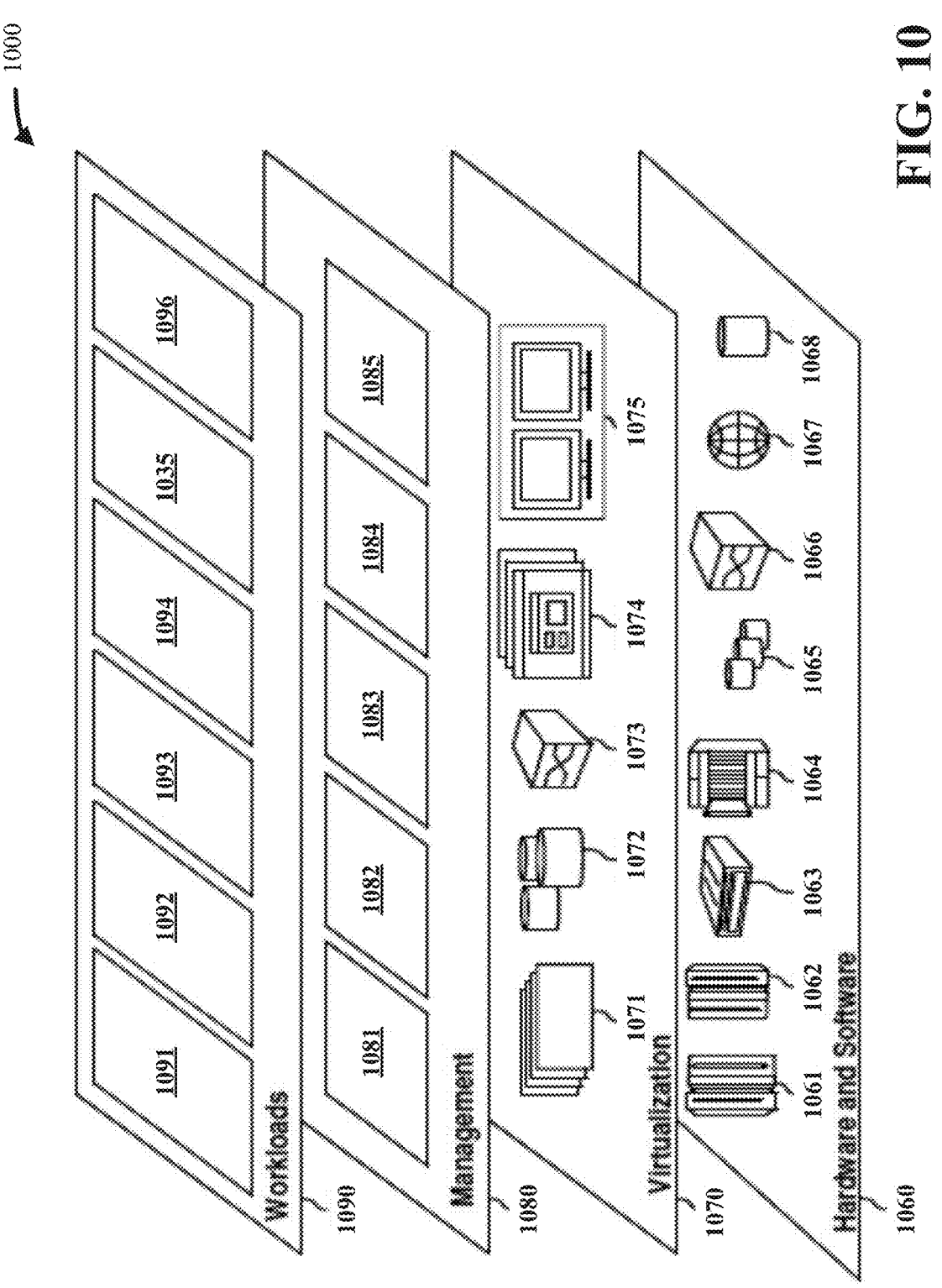
FIG. 10 illustrates a block diagram of example, non-limiting, abstraction model layers in accordance with one or more embodiments described herein.

Turning next to FIGS. 8-10, a detailed description is provided of additional context for the one or more embodiments described herein at FIGS. 1-7.

FIG. 8 and the following discussion are intended to provide a brief, general description of a suitable operating environment 800 in which one or more embodiments described herein at FIGS. 1-7 can be implemented. For example, one or more components and/or other aspects of embodiments described herein can be implemented in or be associated with, such as accessible via, the operating environment 800. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the aforedescribed methods can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and/or the like, each of which can be operatively coupled to one or more associated devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference still to FIG. 8, the example operating environment 800 for implementing one or more embodiments of the aspects described herein can include a computer 802, the computer 802 including a processing unit 806, a system memory 804 and/or a system bus 808. One or more aspects of the processing unit 806 can be applied to processors such as 106 and/or 206 of the non-limiting systems 100 and/or 200. The processing unit 806 can be implemented in combination with and/or alternatively to processors such as 106 and/or 206.

Memory 804 can store one or more computer and/or machine readable, writable and/or executable components and/or instructions that, when executed by processing unit 806 (e.g., a classical processor, a quantum processor and/or like processor), can facilitate performance of operations defined by the executable component(s) and/or instruction
(s). For example, memory 804 can store computer and/or
machine readable, writable and/or executable components
and/or instructions that, when executed by processing unit
806, can facilitate execution of the one or more functions
described herein relating to non-limiting system 100 and/or
non-limiting system 200, as described herein with or without
reference to the one or more figures of the one or more
embodiments.

Memory 804 can comprise volatile memory (e.g., random
access memory (RAM), static RAM (SRAM), dynamic
RAM (DRAM) and/or the like) and/or non-volatile memory
(e.g., read only memory (ROM), programmable ROM
(PROM), electrically programmable ROM (EPROM), elec-
trically erasable programmable ROM (EEPROM) and/or the
like) that can employ one or more memory architectures.

Processing unit 806 can comprise one or more types of
processors and/or electronic circuitry (e.g., a classical pro-
cessor, a quantum processor and/or like processor) that can
implement one or more computer and/or machine readable,
writable and/or executable components and/or instructions
that can be stored at memory 804. For example, processing
unit 806 can perform one or more operations that can be
specified by computer and/or machine readable, writable
and/or executable components and/or instructions including,
but not limited to, logic, control, input/output (I/O), arith-
metic and/or the like. In one or more embodiments, pro-
cessing unit 806 can be any of one or more commercially
available processors. In one or more embodiments, process-
ing unit 806 can comprise one or more central processing
unit, multi-core processor, microprocessor, dual micropro-
cessors, microcontroller, System on a Chip (SOC), array
processor, vector processor, quantum processor and/or
another type of processor. The examples of processing unit
806 can be employed to implement one or more embodi-
ments described herein.

The system bus 808 can couple system components
including, but not limited to, the system memory 804 to the
processing unit 806. The system bus 808 can comprise one
or more types of bus structure that can further interconnect
to a memory bus (with or without a memory controller), a
peripheral bus and/or a local bus using one or more of a
variety of commercially available bus architectures. The
system memory 804 can include ROM 810 and/or RAM
812. A basic input/output system (BIOS) can be stored in a
non-volatile memory such as ROM, erasable programmable
read only memory (EPROM) and/or EEPROM, which BIOS
contains the basic routines that help to transfer information
among elements within the computer 802, such as during
startup. The RAM 812 can include a high-speed RAM, such
as static RAM for caching data.

The computer 802 can include an internal hard disk drive
(HDD) 814 (e.g., EIDE, SATA), one or more external
storage devices 816 (e.g., a magnetic floppy disk drive
(FDD), a memory stick or flash drive reader, a memory card
reader and/or the like) and/or a drive 820, e.g., such as a
solid state drive or an optical disk drive, which can read or
write from a disk 822, such as a CD-ROM disc, a DVD, a
BD and/or the like. Additionally, and/or alternatively, where
a solid state drive is involved, disk 822 could not be
included, unless separate. While the internal HDD 814 is
illustrated as located within the computer 802, the internal
HDD 814 can also be configured for external use in a
suitable chassis (not shown). Additionally, while not shown
in operating environment 800, a solid state drive (SSD) can
be used in addition to, or in place of, an HDD 814. The HDD
814, external storage device(s) 816 and drive 820 can be connected to the system bus 808 by an HDD interface 824,
an external storage interface 826 and a drive interface 828,
respectively. The HDD interface 824 for external
implementations can include at least one or both of Univer-
sal Serial Bus (USB) and Institute of Electrical and Elec-
tronics Engineers (IEEE) 1394 interface technologies. Other
external drive connection technologies are within contem-
plation of the embodiments described herein.

The drives and their associated computer-readable storage
media provide nonvolatile storage of data, data structures,
computer-executable instructions, and so forth. For the
computer 802, the drives and storage media accommodate
the storage of any data in a suitable digital format. Although
the description of computer-readable storage media above
refers to respective types of storage devices, other types of
storage media which are readable by a computer, whether
presently existing or developed in the future, can also be
used in the example operating environment, and/or that any
such storage media can contain computer-executable
instructions for performing the methods described herein.

A number of program modules can be stored in the drives
and RAM 812, including an operating system 830, one or
more applications 832, other program modules 834 and/or
program data 836. All or portions of the operating system,
applications, modules and/or data can also be cached in the
RAM 812. The systems and/or methods described herein can
be implemented utilizing one or more commercially avail-
able operating systems and/or combinations of operating
systems.

Computer 802 can optionally comprise emulation tech-
nologies. For example, a hypervisor (not shown) or other
intermediary can emulate a hardware environment for oper-
ating system 830, and the emulated hardware can optionally
be different from the hardware illustrated in FIG. 8. In a
related embodiment, operating system 830 can comprise one
virtual machine (VM) of multiple VMs hosted at computer
802. Furthermore, operating system 830 can provide runtime
environments, such as the JAVA runtime environment or the
.NET framework, for applications 832. Runtime environ-
ments are consistent execution environments that can allow
applications 832 to run on any operating system that
includes the runtime environment. Similarly, operating sys-
tem 830 can support containers, and applications 832 can be
in the form of containers, which are lightweight, standalone,
executable packages of software that include, e.g., code,
runtime, system tools, system libraries and/or settings for an
application.

Further, computer 802 can be enabled with a security
module, such as a trusted processing module (TPM). For
instance, with a TPM, boot components hash next in time
boot components and wait for a match of results to secured
values before loading a next boot component. This process
can take place at any layer in the code execution stack of
computer 802, e.g., applied at application execution level
and/or at operating system (OS) kernel level, thereby
enabling security at any level of code execution.

An entity can enter and/or transmit commands and/or
information into the computer 802 through one or more
wired/wireless input devices, e.g., a keyboard 838, a touch
screen 840 and/or a pointing device, such as a mouse 842.
Other input devices (not shown) can include a microphone,
an infrared (IR) remote control, a radio frequency (RF)
remote control and/or other remote control, a joystick, a
virtual reality controller and/or virtual reality headset, a
game pad, a stylus pen, an image input device, e.g.,
camera(s), a gesture sensor input device, a vision movement
sensor input device, an emotion or facial detection device, a biometric input device, e.g., fingerprint and/or iris scanner, and/or the like. These and other input devices can be connected to the processing unit 806 through an input device interface 844 that can be coupled to the system bus 808, but can be connected by other interfaces, such as a parallel port, an IEEE 1394 serial port, a game port, a USB port, an IR interface, a BLUETOOTH® interface and/or the like.

A monitor 846 or other type of display device can be alternatively and/or additionally connected to the system bus 808 via an interface, such as a video adapter 848. In addition to the monitor 846, a computer typically includes other peripheral output devices (not shown), such as speakers, printers and/or the like.

The computer 802 can operate in a networked environment using logical connections via wired and/or wireless communications to one or more remote computers, such as a remote computer(s) 850. The remote computer(s) 850 can be a workstation, a server computer, a router, a personal computer, portable computer, microprocessor-based entertainment appliance, a peer device and/or other common network node, and typically includes many or all of the elements described relative to the computer 802, although, for purposes of brevity, only a memory/storage device 852 is illustrated. Additionally, and/or alternatively, the computer 802 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 854 and/or larger networks, e.g., a wide area network (WAN) 856. LAN and WAN networking environments can be commonplace in offices and companies and can facilitate enterprise-wide computer networks, such as intranets, all of which can connect to a global communications network, e.g., the Internet.

When used in a LAN networking environment, the computer 802 can be connected to the local network 854 through a wired and/or wireless communication network interface or adapter 858. The adapter 858 can facilitate wired and/or wireless communication to the LAN 854, which can also include a wireless access point (AP) disposed thereon for communicating with the adapter 858 in a wireless mode.

When used in a WAN networking environment, the computer 802 can include a modem 860 and/or can be connected to a communications server on the WAN 856 via other means for establishing communications over the WAN 856, such as by way of the Internet. The modem 860, which can be internal and/or external and a wired and/or wireless device, can be connected to the system bus 808 via the input device interface 844. In a networked environment, program modules depicted relative to the computer 802 or portions thereof can be stored in the remote memory/storage device 852. The network connections shown are merely exemplary and one or more other means of establishing a communications link among the computers can be used.

When used in either a LAN or WAN networking environment, the computer 802 can access cloud storage systems or other network-based storage systems in addition to, and/or in place of, external storage devices 816 as described above, such as but not limited to, a network virtual machine providing one or more aspects of storage and/or processing of information. Generally, a connection between the computer 802 and a cloud storage system can be established over a LAN 854 or WAN 856 e.g., by the adapter 858 or modem 860, respectively. Upon connecting the computer 802 to an associated cloud storage system, the external storage interface 826 can, such as with the aid of the adapter 858 and/or modem 860, manage storage provided by the cloud storage system as it would other types of external storage. For instance, the external storage interface 826 can be configured to provide access to cloud storage sources as if those sources were physically connected to the computer 802.

The computer 802 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 13, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1950 described below with reference to FIG. 9, and/or with reference to the one or more functional abstraction layers (e.g., quantum software and/or the like) described below with reference to FIG. 10, to execute one or more operations in accordance with one or more embodiments described herein. For example, cloud computing environment 950 and/or one or more of the functional abstraction layers 1060, 1070, 1080 and/or 1090 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein.

It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting system 100 and/or the example operating environment 800 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 800 can be employed to use hardware and/or software to solve problems that are highly technical in nature, that are not abstract and/or that cannot be performed as a set of mental acts by a human.

Referring now to details of one or more aspects illustrated at FIG. 9, the illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C and/or automobile computer system 954N can communicate. Although not illustrated in FIG. 9, cloud computing nodes 910 can further comprise a quantum platform (e.g., quantum computer, quantum hardware, quantum software and/or the like) with which local computing devices used by cloud consumers can communicate. Cloud computing nodes 910 can communicate with one another. They can be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that cloud computing nodes 910 and cloud computing environment 950 can communicate with any type of computerized device over any type of network and/or network addressable connection (e.g., using a web browser).

Referring now to details of one or more aspects illustrated at FIG. 10, a set 1000 of functional abstraction layers is shown, such as provided by cloud computing environment 950 (FIG. 19). One or more embodiments described herein can be associated with, such as accessible via, one or more functional abstraction layers described below with reference to FIG. 10 (e.g., hardware and software layer 1060, virtualization layer 1070, management layer 1080 and/or workloads layer 1090). It should be understood in advance that the components, layers and/or functions shown in FIG. 10 are intended to be illustrative only and embodiments described herein are not limited thereto. As depicted, the following layers and/or corresponding functions are provided:

Hardware and software layer 1060 can include hardware and software components. Examples of hardware components include: mainframes 1061; RISC (Reduced Instruction Set Computer) architecture-based servers 1062; servers 1063; blade servers 1064; storage devices 1065; and/or networks and/or networking components 1066. In one or more embodiments, software components can include network application server software 1067, quantum platform routing software 1068; and/or quantum software (not illustrated in FIG. 10).

Virtualization layer 1070 can provide an abstraction layer from which the following examples of virtual entities can be provided: virtual servers 1071; virtual storage 1072; virtual networks 1073, including virtual private networks; virtual applications and/or operating systems 1074; and/or virtual clients 1075.

In one example, management layer 1080 can provide the functions described below. Resource provisioning 1081 can provide dynamic procurement of computing resources and other resources that can be utilized to perform tasks within the cloud computing environment. Metering and Pricing 1082 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1083 can provide access to the cloud computing environment for consumers and system administrators. Service level management 1084 can provide cloud computing resource allocation and/or management such that required service levels are met. Service Level Agreement (SLA) planning and fulfillment 1085 can provide pre-arrangement for, and procurement of, cloud computing resources for which a future requirement is anticipated in accordance with an SLA.

Workloads layer 1090 can provide examples of functionality for which the cloud computing environment can be utilized. Non-limiting examples of workloads and functions which can be provided from this layer include: mapping and navigation 1091; software development and lifecycle management 1092; virtual classroom education delivery 1093; data analytics processing 1094; transaction processing 1095; and/or application transformation software 1096.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes the computer executable components stored in the memory, wherein the computer executable components comprise:
   a selection component that selects an ensemble of deep learning regressors respectively comprising one or more deep learning models, wherein the one or more deep learning models are trained and deployed in a computing environment accessible to users;
   an identification component that identifies that the ensemble is experiencing drift, wherein identifying that the ensemble is experiencing the drift comprises determining that a majority of the deep learning regressors of the ensemble have the drift;

an analysis component that analyzes uncertainty samplings from the ensemble to determine a time period when the drift occurred, wherein the determining the time period comprises:

identifying, as a beginning of the time period, an earliest time instance when any one deep learning regressor of the majority started experiencing the drift, and identifying, as an ending time of the time period, a latest time instance when any other deep learning regressor of the majority started experiencing the drift; and a training component that retrains at least one deep learning model of at least one of the deep learning regressors of the majority based on the drift and the time period when the drift occurred.

2. The system of claim 1, wherein the identification component identifies that the ensemble is experiencing the drift based on a comparison between the uncertainty samplings, from the ensemble, having a highest uncertainty among a set of comparisons of the uncertainty samplings.

3. The system of claim 1, wherein the computer executable components further comprise:

a sampling component that samples one or more levels of uncertainty of the deep learning regressors of the ensemble.

4. The system of claim 1, wherein the training component retrains less than all deep learning models of all the deep learning regressors of the ensemble based on a selectively identified confidence interval threshold for the drift.

5. The system of claim 1, wherein the deep learning regressors comprise a deep neural network and a transformer that employ sequence to sequence learning.

6. The system of claim 1, wherein the wherein identifying the drift is further based on at least one of respective lower uncertainty bounds or respective upper uncertainty bounds for the one or more deep learning models.

7. The system of claim 1, wherein the identification component identifies the drift based further on respective upper uncertainty bounds for the one or more deep learning models.

8. The system of claim 1, wherein the identification component identifies the drift based further on respective lower uncertainty bounds for the one or more deep learning models.

9. A computer-implemented method, comprising:

selecting, by a system operatively coupled to a processor, an ensemble of deep learning regressors respectively comprising one or more deep learning models, wherein the one or more deep learning models are trained and deployed in a computing environment accessible to users;

identifying, by the system, that the ensemble is experiencing drift, wherein identifying that the ensemble is experiencing the drift comprises determining that a majority of the deep learning regressors of the ensemble have the drift;

analyzing, by the system, uncertainty samplings from the ensemble to determine a time period when the drift occurred, wherein the determining the time period comprises:

identifying, as a beginning of the time period, an earliest time instance when any one deep learning regressor of the majority started experiencing the drift, and identifying, as an ending time of the time period, a latest time instance when any other deep learning regressor of the majority started experiencing the drift; and retraining, by the system, at least one deep learning model of at least one of the deep learning regressors of the majority based on the drift and the time period when the drift occurred.

10. The computer-implemented method of claim 9, further comprising:

identifying, by the system, that the ensemble is experiencing the drift based on a comparison between the uncertainty samplings, from the ensemble, having a highest uncertainty among a set of comparisons of the uncertainty samplings.

11. The computer-implemented method of claim 9, further comprising:

sampling, by the system, one or more levels of uncertainty of the deep learning regressors of the ensemble.

12. The computer-implemented method of claim 9, wherein the retraining comprises:

retraining, by the system, less than all deep learning models of all the deep learning regressors of the ensemble based on a selectively identified confidence interval threshold for the drift.

13. The computer-implemented method of claim 9, wherein the deep learning regressors comprise a deep neural network and a transformer that employ sequence to sequence learning.

14. The computer-implemented method of claim 9, wherein identifying the drift is further based on respective upper uncertainty bounds for the one or more deep learning models.

15. The computer-implemented method of claim 9, wherein identifying the drift is further based on respective lower uncertainty bounds for the one or more deep learning models.

16. A computer program product facilitating a process to train learning models based on determined drift, the computer program product comprising a computer readable storage medium having program instructions embodied therewith, the program instructions executable by a processor to cause the processor to:

select, by the processor, an ensemble of deep learning regressors respectively comprising one or more deep learning models, wherein the one or more deep learning models are trained and deployed in a computing environment accessible to users;

identify, by the processor, that the ensemble is experiencing drift, wherein identifying that the ensemble is experiencing the drift comprises determining that a majority of the deep learning regressors of the ensemble have the drift;

analyze, by the processor, uncertainty samplings from the ensemble to determine a time period when the drift occurred, wherein the determining the time period comprises:

identifying, as a beginning of the time period, an earliest time instance when any one deep learning regressor of the majority started experiencing the drift, and identifying, as an ending time of the time period, a latest time instance when any other deep learning regressor of the majority started experiencing the drift; and retrain, by the processor, at least one deep learning model of at least one of the deep learning regressors of the majority based on the drift and the time period when the drift occurred.

17. The computer program product of claim 16, wherein the program instructions are further executable by the processor to cause the processor to:

identify, by the processor, that the ensemble is experiencing the drift based on a comparison between the uncertainty samplings, from the ensemble, having a highest uncertainty among a set of comparisons of the uncertainty samplings.

18. The computer program product of claim 16, wherein the program instructions are further executable by the processor to cause the processor to:

sample, by the processor, one or more levels of uncertainty of the deep learning regressors of the ensemble.

19. The computer program product of claim 16, wherein the retraining comprises:

retraining less than all deep learning models of all the deep learning regressors of the ensemble based on a selectively identified confidence interval threshold for the drift.

20. The computer program product of claim 16, wherein the deep learning regressors comprise a deep neural network and a transformer that employ sequence to sequence learning.

* * * * *